2,959,536

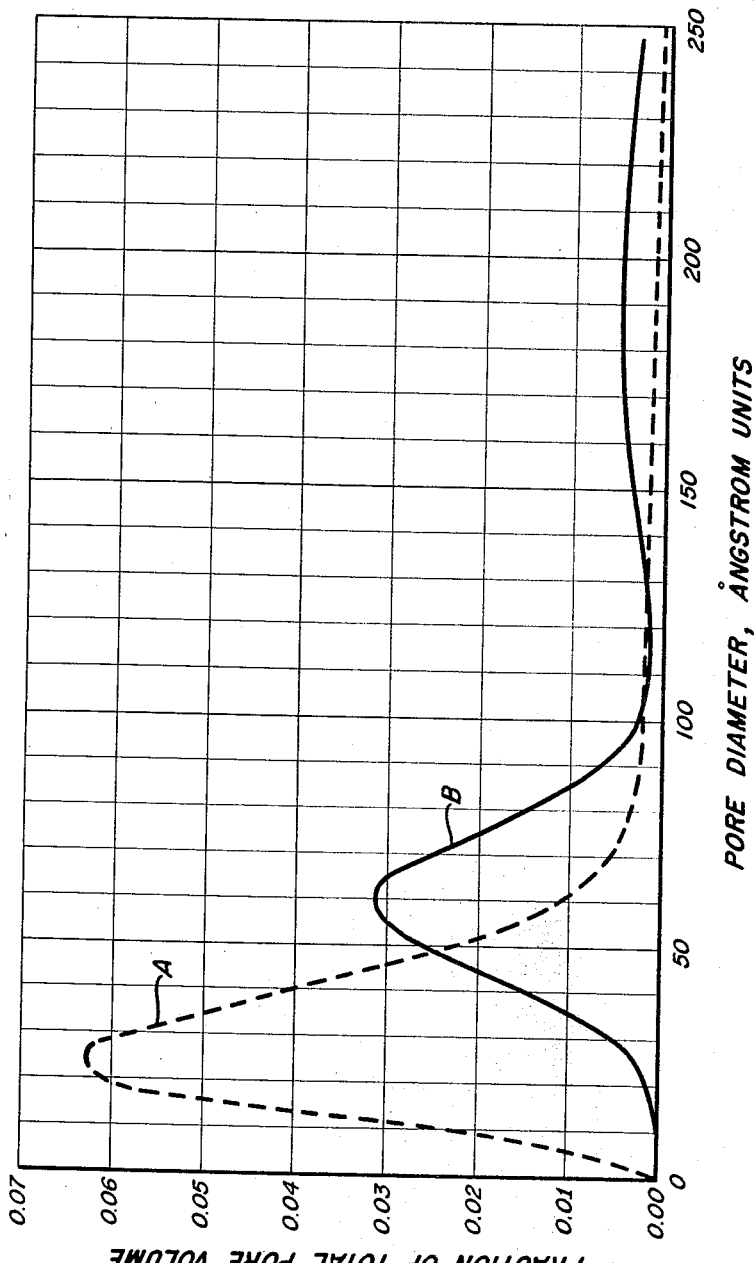
Harry M. Brennan
Roy W. Vander Haar
Edmund Field
INVENTORS.
BY Everet F. Smith
ATTORNEY

# United States Patent Office 2,959,536
Patented Nov. 8, 1960

PLATINUM-ALUMINA CATALYSTS

Harry M. Brennan, Hammond, and Roy W. Vander Haar, Highland, Ind., and Edmund Field, Chicago, Ill., assignors to Standard Oil Company, Chicago, Ill., a corporation of Indiana Filed Apr. 15, 1955, Ser. No. 501,618

12 Claims. (Cl. 208—137)

This invention relates to the conversion of hydrocarbons, and more particularly to the catalytic hydroforming of petroleum naphthas. Specifically, the invention relates to an improved alumina-supported platinum catalyst and to the manufacture of high-octane gasolines therewith.

Platinum-group metal catalysts have long been known and used in carrying out various chemical reactions, such as the hydrogenation of carbonyl groups and unsaturated carbon-carbon linkages, dehydrogenation of naphthenes, oxidation of sulfur dioxide, and many others. More recently, alumina-supported platinum catalysts have come into commercial use as catalysts for hydroforming petroleum naphthas, whereby gasoline products are obtained having greatly improved antiknock ratings. Platinum-alumina catalysts for this purpose have been prepared by a variety of techniques. In a simple procedure, solid alumina is impregnated with a solution of chloroplatinic acid or other soluble platinum compound, and the resulting material is dried and calcined at elevated temperature, yielding an active catalyst without further treatment. In another procedure, the platinum solution is first treated with hydrogen sulfide before being used for impregnation, in order to convert the platinum into a suspension of platinum sulfide. The latter does not appear to migrate to any objectionable extent in the alumina support during drying and calcining, and an even distribution of the platinum on the support is accordingly maintained during such operations. Other variant techniques are disclosed in the art, virtually all of which are concerned with the problem of preparing and preserving an even distribution of active platinum in the alumina.

The alumina supporting material for the prior-art catalysts can be prepared in a wide variety of ways. The method that has heretofore been most commonly employed comprises the steps of dissolving an aluminum salt in water, adding ammonium hydroxide or other alkali to precipitate an alumina gel, and washing and drying the gel. Another method starts with an alumina hydrosol, from which a suitable alumina gel can be prepared either by simple dehydration or by addition of an electrolyte. In a further method, an aluminum alkoxide is hydrolyzed in water to produce a sol or gel, from which solid alumina can be prepared according to conventional procedures. All of these methods are capable of producing alumina of a quality suitable for use as a support for platinum-containing catalysts of the prior-art types.

An excellent catalyst of the prior-art type can be prepared according to the procedure described by Heard et al. in U.S. Patent 2,659,701 (November 17, 1953). Heard et al. preferably start with an alumina hydrosol of the type described by Heard in Re. 22,196 (October 6, 1942), obtained by digesting amalgamated aluminum in dilute aqueous acetic acid solution. From about 0.05 to 1 percent by weight of platinum is combined therewith, based on dry $Al_2O_3$, in the form of an aqueous chloroplatinic acid solution to which has been added a sufficient quantity of an ammonium sulfide to convert the platinum into a stable sol or solution. The resulting mixture is agitated and adjusted to a pH around 6 to 7 with aqueous 10 percent ammonium hydroxide, as a result of which the entire mass sets to a vibrant ultragel. The gel is dried in air at around 220° F. to a volatiles content of 35 to 50 percent, wet basis, and is further dried in air at 900° F. for around 20 hours to a volatiles content of around 10 percent. The dried cake is ground to pass 30 mesh, lubricated with 4 percent Sterotex, formed into shapes as desired (suitably ⅛″ x ⅛″ cylindrical pellets), and calcined in air at 1100° F. for around 6 hours. Such catalysts ordinarily have a relative activity of 60, measured against an arbitrarily chosen standard catalyst having an assigned activity of 100.

We have now discovered a new technique for the preparation of solid, hydrous alumina and for the incorporation of platinum therein which yields a completed catalyst having a hydroforming activity up to two or three times as great as prior-art catalysts having the same platinum concentration. It is accordingly an object of our invention to improve the conversion of hydrocarbons, and particularly to improve the hydroforming of petroleum naphthas to produce gasolines of high octane number. Another object is to produce an alumina-supported platinum catalyst of improved activity. A further object is to produce a platinum-alumina catalyst of satisfactory activity having a lower concentration of platinum than the prior-art catalysts. These and other objects of our invention will be apparent from the following description thereof.

Our invention broadly comprises the steps of exposing an alumina hydrosol or other form of peptized alumina to alkaline conditions within the range of about pH 8.5 to 12 for 1 to 48 hours or more, separating solid, hydrous alumina from the resulting slurry, drying the alumina to a volatiles content less than about 50 percent by weight, wet basis, impregnating the dried alumina with a platinum-containing solution, and finally drying and calcining.

Alumina hydrosols can be prepared by a number of methods, such as by hydrolyzing aluminum acetate or an aluminum alkoxide in an aqueous medium under controlled conditions, digesting hydrous alumina in dilute acid, and the like. Alumina hydrosols are most conveniently prepared, however, by the technique described in Heard Re. 22,196, referred to above. According to this technique, aluminum metal in the form of sheets, granules, turnings, sawdust, chips, shot, rings, irregular shapes, or the like, is subjected to amalgamation by contact with mercury or an aqueous solution of a mercury salt. The amalgamated aluminum is then digested in water in the presence of a low concentration (suitably around 2 percent by weight) of acetic acid or other weak organic acid as a peptizing agent. The reaction goes forward readily at ordinary or autogenous pressures and at temperatures above about 100° F., preferably between about 125 and 210° F. Thick, viscous hydrosols can be obtained at temperatures above 160° F., while relatively thin hydrosols are obtained at temperatures below 160° F. The mixture of amalgamated aluminum and acidulated water is preferably agitated in order to improve the contact of the reacting materials and to assist in breaking the layer of froth which is ordinarily formed by the hydrogen liberated in the reaction. A reflux condenser is advantageously employed to condense water and acid vapors from the emerging hydrogen stream and to return the resulting condensate to the reaction vessel. The reaction gradually slows down after about 24 hours and ordinarily ceases for all practical purposes after about 30 hours. The reaction product is thereafter clarified by settling, centrifugation, filtration, or the like, to remove any suspended solids, including particles of metallic mercury. The hydrosol product is a syrupy liquid of opalescent, nearly transparent appearance, containing from around 2 to 10 percent by weight of $Al_2O_3$.

Another form of peptized alumina suitable for use as the starting material in our invention can be prepared by a modification of the Heard technique, omitting the weak organic acid peptizing agent in the digestion of the amalgamated aluminum, so that a slurry of hydrous alumina is obtained, separating the hydrous alumina, and thereafter digesting the hydrous alumina with acetic acid or other weak organic acid to peptize the alumina. The resulting suspension or slurry can be treated according to our process to prepare an improved platinum-alumina catalyst.

In one embodiment of our invention, a Heard-type alumina hydrosol or other suitably prepared form of peptized alumina is agitated and commingled with an alkaline substance, preferably ammonia or ammonium hydroxide, in a quantity sufficient to raise the pH above about 8.5, but insufficient to convert any considerable proportion of the alumina into an aluminate salt. We ordinarily operate at a pH no higher than the maximum level obtainable by adding ammonia to the system under pressure (i.e., below about pH 12), and we prefer to operate in the range of about pH 10 to 11. The alkalized hydrosol is aged for about 1 to 48 hours or more at about 50 to 250° F., preferably at ordinary temperatures around 70 to 100° F. for about 6 to 24 hours, the shorter aging periods corresponding generally to the higher pH levels and (in lesser degree) to the higher temperatures. During this operation, white, finely divided hydrous alumina forms in the liquid phase as a filterable slurry, the reaction being ordinarily complete in as little as one hour at pH 9.5 or above, whereas a day may be required at pH 9, and 2 to 3 days at pH 8.5. The slurry thus obtained is filtered to separate the hydrous alumina, suitably at an elevated temperature between about 150 and 200° F. in order to ensure a rapid filtration rate. The filter cake is then dried at ordinary or elevated temperatures up to about 1200° F., preferably between about 150 and 400° F., to a volatiles content less than about 50 percent, wet basis, preferably between about 15 and 40 percent. The dried cake is thereafter impregnated with a platinum-containing solution according to any of the techniques of the prior art, such as those referred to above, to a platinum level between about 0.05 and 1 percent by weight, based on dry $Al_2O_3$. For this purpose, we find it especially advantageous to employ an aqueous chloroplatinic acid solution in a quantity just sufficient to saturate the alumina powder, and to adjust the concentration of platinum in the solution to produce a completed catalyst of the desired platinum content. Thereafter, an ammonium sulfide solution is added in an S:Pt atomic ratio between about 1 and 10 to effect uniform distribution of the platinum in and on the alumina. The impregnated alumina is again dried, pelleted if desired, and finally calcined in air, hydrogen, or an inert gas such as nitrogen or flue gas at 800 to 1200° F., preferably 1000 to 1200° F., for around 3 to 24 hours before being placed on stream in a catalytic process.

Ammonia or ammonium hydroxide is a highly advantageous material for use as the alkalizing agent for treating peptized alumina in our process. Other nitrogen bases can also be employed for this purpose, including water-soluble amines such as methylamine, dimethylamine, trimethylamine, ethylamines, isopropylamine, diisopropylamine, and furfurylamine, quaternary ammonium hydroxides such as tetramethylammonium hydroxide and benzyltrimethylammonium hydroxide, and the like. Inorganic bases and alkalies such as sodium hydroxide, sodium carbonate, potassium carbonate, calcium hydroxide, and the like may also be employed in quantities carefully limited to avoid excessively high pH levels; but after such materials are used, it is generally desirable to wash the alkali-aged alumina thoroughly to remove the alkali cations therefrom. In all cases, the alkalizing agent must have an ionization constant sufficiently high to permit it to raise the peptized alumina mixture to a pH above about 8.5, and must be used in a sufficient quantity to reach the desired pH level, but insufficient to convert any considerable quantity of the alumina into aluminate salts. On this basis, a pH of around 11.5 is the practical maximum which we ordinarily choose to employ, and can be produced, for example, by adding about two volumes of aqueous 29 percent ammonium hydroxide to one volume of Heard-type alumina hydrosol. In commingling the alumina with the alkalizing agent, it is desirable to employ rapid agitation, dilution, controlled rate of addition, multiple-point addition, and other expedients known to the art to avoid or to minimize effects of localized overtreatment.

An important feature of our new process is the step of drying the alkali-aged alumina prior to impregnation with platinum. According to our experience, it is sufficient to dry the alumina to a volatiles content below about 50 percent by weight, wet basis, prior to platinum impregnation, the alumina being converted thereby into a precursor of eta-alumina. The drying is suitably carried out at ordinary or elevated temperatures up to about 400° F., preferably between about 150 and 400° F., and preferably to a volatiles content between about 15 and 40 percent. A drying time of about 1 to 24 hours is ordinarily sufficient, and under favorable conditions a near approach to the equilibrium volatiles content at most temperatures can be achieved in around 5 hours on the average. The approximate equilibrium or near-equilibrium volatiles content of the alumina cake at a series of drying temperatures is set forth in the following table:

| Drying Temperature, ° F. | Ratio, $H_2O:Al_2O_3$, molar | Volatiles Content, wet basis, wt.-percent |
| --- | --- | --- |
| 220 | 3 | 34.6 |
| 300 | 2.8 | 33.1 |
| 400 | 1 | 15 |

The resulting dried cake, unlike most aluminas known to the prior art, can be pelleted immediately if desired, without a preliminary calcination at high temperature, requiring only pulverization and the addition of a lubricant of the usual sort, such as 4 percent of Sterotex. The dried alumina, before or after being pelleted, but preferably after being impregnated with platinum, is readily converted wholly or in part into eta-alumina by the simple device of further drying at higher temperatures, suitably between about 500 and 1200° F. for a period of 1 to 24 hours or more, and preferably between about 800 and 1200° F. for a period of around 6 to 12 hours, or to a volatiles content approximating the equilibrium level at the temperature employed, as illustrated in the following table:

| Drying Temperature, ° F. | Ratio, $H_2O:Al_2O_3$, molar | Volatiles Content, wet basis, wt.-percent |
| --- | --- | --- |
| 600 | 0.45 | 7.4 |
| 650 | 0.4 | 6.6 |
| 900 | 0.06 | 1 |

Where the dried alumina has been subjected to pelleting before being converted to eta-alumina, the said conversion is preferably carried out at 1000 to 1200° F. in order to produce completed pellets of highest mechanical strength. The completed alumina, we have found, contains a substantial proportion of eta-alumina, ordinarily 5 percent or more, as indicated by the X-ray diffraction pattern thereof, and may contain approaching 100 percent eta-alumina, depending upon the duration, pH, and temperature of the aging period, and the duration and temperature of the heating periods.

It will be apparent that a preliminary drying to form eta-alumina precursor and a further heat-treatment to form eta-alumina may be carried out in an uninterrupted operation if desired at progressively rising temperature, although we prefer to effect platinum impregnation between the two stages. Alternatively, the entire drying and heat-treating operation may be carried out in a treating zone nominally maintained at a temperature within the range required for the production of eta-alumina (i.e., from about 500 to 1200° F.). In this modification, the preliminary drying is carried out rapidly at rising temperature during evolution of the volatiles, and the period of conversion to eta-alumina follows immediately without interruption.

Our new catalyst can be prepared in any of the usual mechanical forms. It can be ground to a powder for use in fluidized form. It can be broken into irregular fragments. It can be prepared in various shapes, such as pills, pellets, rings, rosettes, saddles, and the like as desired. In the preparation of shaped catalysts, as pointed out hereinabove, our alumina base does not require a preliminary calcination; instead, the dried cake can be pulverized, mixed with a lubricant, and formed directly into shapes; and only thereafter is calcination employed to effect formation of eta-alumina and to set and strengthen the mechanical structure of the shaped material. In most cases, the final conditioning of the catalyst composition, whether pelleted or not, is carried out by calcination in air, hydrogen, or an inert gas at about 1000 to 1200° F. for around 3 to 24 hours before being placed on stream.

"Eta-alumina," as the term is employed herein, refers to a form of alumina of the type defined by Allen S. Russell in his brochure entitled "Alumina Properties," Technical Paper No. 10, copyright 1953, Aluminum Company of America, page 17. In one prior-art method for the preparation of eta-alumina, beta-alumina trihydrate is dried at 284 to 464° F. to an alpha-alumina monohydrate, and the alpha-alumina monohydrate is further heated at 482 to 842° F. The resulting composition is largely eta-alumina, which closely resembles gamma-alumina and is distinguishable therefrom in physical properties only by slight differences in their X-ray diffraction patterns (Stumpf, Russell, Newsome, and Tucker, Ind. Eng. Chem. 42 (1950), 1398–1403). Moreover, it is commonly found that such compositions contain a substantial proportion of gamma-alumina, which, however, is without adverse catalytic effects. Our alumina, after calcination under the conditions described above, contains 5 percent or more of eta-alumina, but differs from the prior-art eta-alumina compositions in some unascertained way, as a result of which it affords platinum-alumina catalysts of strikingly superior activity.

In another embodiment of our invention, a viscous, Heard-type alumina hydrosol, prepared by digesting amalgamated aluminum in aqueous 2 percent acetic acid at a temperature between about 160 and 170° F., and containing approximately 5 percent by weight of $Al_2O_3$, is mixed with a sufficient quantity of aqueous ammonia containing from about 10 to 28 weight-percent $NH_3$ to raise the pH thereof to approximately 9. A slurry of alumina begins to form immediately, and the slurry is allowed to age at the said pH level for approximately 24 hours at room temperature. Thereafter, the slurry is heated to a temperature around 180° F. and filtered. The filter cake, containing around 87 percent by weight of volatiles, wet basis, is dried at approximately 220° F. for 24 hours to a volatiles content of around 35 percent. The dried cake is then broken up to pass a 30-mesh screen, and the resulting powder is ready for impregnation. The platinum is added as an aqueous chloroplatinic acid solution into which ammonium sulfide has been incorporated in an S:Pt atomic ratio between about 1 and 10. The platinum solution is employed in a quantity just sufficient to saturate the alumina powder, and the concentration of platinum in the solution is previously adjusted to produce a final catalyst containing approximately 0.6 percent by weight of platinum, based on dry $Al_2O_3$. Following the platinum addition, the catalytic mixture is dried at 200 to 400° F., a drying period of 6 to 24 hours being ordinarily adequate, and the dried cake is again crushed, formed into shapes as desired, and calcined at 800 to 1200° F. for 1 to 24 hours, optimally around 1100° F. for 2 to 6 hours.

When the alkali-treatment of peptized alumina according to our invention is continued for an extended period of time, e.g., 60 hours or more, and the treated material is dried and calcined, the completed alumina (as well as catalysts based thereon) exhibits two maxima in the curve of pore volume plotted against pore diameter. This effect is illustrated in the attached drawing, which represents the pore-size distribution of two platinum-alumina catalysts. Curve A represents the pore-volume distribution of a 0.6 percent platinum catalyst based on eta-alumina, prepared according to our invention by aging a Heard-type alumina hydrosol at pH 11 and room temperature for 17 hours, then drying and calcining. This catalyst, it will be observed, shows a single maximum at a pore diameter of approximately 25 angstrom units. Curve B represents a catalyst prepared in a similar manner, with the exception that the ammonia aging was continued for a period of 6 days. This catalyst exhibits a principal maximum at approximately 60 angstrom units and a secondary maximum at approximately 185 angstrom units. These curves were determined by low-temperature nitrogen adsorption, followed by matching with standard isotherms, in the manner described by Shull and by Shull, Elkin, and Roess, J. Am. Chem. Soc., 70 (1948), 1405 and 1410. We have observed that platinum-alumina catalysts based on eta-alumina of the "double-maximum" type are distinctly superior in activity maintenance, but we are uncertain as to the reason for such superiority, and we are also unable to offer an explanation of the mechanism whereby the "double-maximum" structure arises. Owing to the superiority of this type of alumina in affording platinum-alumina catalysts of improved stability, we find it highly advantageous to carry out the alkali-aging step of our process for a period of 75 to 150 hours, optimally around 100 hours. The treated alumina is thereafter dried, combined with platinum, and calcined as in other embodiments of the invention.

In another advantageous embodiment of our invention, our alkali-aged alumina is subjected to a drying or calcination procedure, preferably in air, at an elevated temperature between about 800 and 1200° F. for 2 to 24 hours, and is thereafter impregnated with a platinum solution containing dissolved therein an inorganic water-soluble aluminum salt. Such a high-temperature calcination may follow or supplant a drying step at lower temperature, as previously described. Additionally, where a preliminary drying operation is carried out, the pre-dried alumina may be crushed, lubricated, and formed into shaped particles prior to the high-temperature calcination. The impregnated alumina is again dried and calcined under conventional conditions. Suitable aluminum salts include the nitrate, the sulfate, and other inorganic aluminum salts which can be dissolved in water without separation of hydrous alumina. We prefer to use the soluble halides, specifically the bromide or iodide, or optimally the chloride. In all cases, a hydrate of the chosen salt may also be used, and the solution may include an organic solvent or a mixture thereof, such as acetone, methanol, ethanol, isopropyl alcohol, and the like, or other wetting agent, such as sodium benzenesulfonate, a polyethylene glycol, a glycol ether, or the like. The concentration of aluminum salt may suitably range upward from about 0.01 M to 0.3 M or more, depending upon the quantity of aluminum salt to be added to the catalyst. We prefer to employ a concentration and a quantity of solution sufficient to incorporate the aluminum salt in the catalyst in a molar ratio to the alumina between about 0.001:1 and 0.02:1. Catalysts of exceptionally high activity and mechanical strength are obtained in this embodiment of our invention.

The following specific examples will more clearly illustrate the technique and advantages of our invention.

*Example 1*

A Heard-type hydrosol was prepared according to the following procedure. Into a reaction vessel of suitable size were successively charged 1,850 parts by weight of water and 50 parts by weight of aluminum pellets, followed by 35 parts by weight of glacial acetic acid. The mixture was agitated and heated to 120–130° F., and 0.5 part by weight of mercuric oxide was added to effect amalgamation of the aluminum. The reaction mixture was then heated to 160–170° F., at which point the reaction proceeded vigorously, evolving hydrogen and producing a thick froth on the surface of the liquid. Agitation and heating were continued for 24 hours, at the end of which time the reaction had subsided. The reaction product was allowed to settle for 12 hours, and the hydrosol was decanted from the reaction vessel.

An 8-kilogram portion of the hydrosol containing 5.51 percent by weight of $Al_2O_3$ was stirred and adjusted to a pH of approximately 10 by addition of the required quantity of aqueous 29 percent ammonium hydroxide. The mixture was thereafter allowed to stand at room temperature for a total period of 18 hours. The resulting slurry was filtered. The filter cake was dried in air at a temperature of 220° F. for 38 hours to a volatiles content of approximately 35 percent by weight, wet basis. The dried cake, weighing approximately 200 grams, was crushed to pass 30 mesh, and was impregnated with platinum to a level of 0.6 percent by weight, based on dry $Al_2O_3$. For the impregnation, an aqueous platinum solution was used which had been prepared by adding one milliliter of aqueous 23 percent ammonium sulfide solution to a solution of 1.8 grams of chloroplatinic acid in 100 milliliters of water. The impregnated alumina was again dried at 220° F. for 16 hours, 4 percent by weight of Sterotex was added as a lubricant, and the material was formed into ⅛" x ⅛" pellets in a pilling machine. The resulting pellets were calcined in air at 1100° F. for 6 hours.

For comparison, an impregnated platinum-alumina catalyst of a conventional type was prepared by drying a Heard-type alumina hydrosol at 220° F. for 18 hours to a volatiles content of approximately 35 percent by weight, wet basis, then impregnating to a level of 0.6 percent by weight of platinum, based on dry $Al_2O_3$, according to the impregnation technique described above.

The completed catalysts were subjected to a hydroforming test under standardized conditions, employing 50 milliliters of catalyst in a quasi-isothermal reaction zone surrounded by an electrically heated block for temperature control. The tests were carried out at a catalyst outlet temperature of 920° F., a pressure of 200 pounds per square inch gage, an hourly weight space velocity of 2, and a once-through hydrogen rate of 5,000 standard cubic feet per barrel of feed. The feed was a Mid-Continent virgin naphtha having an ASTM distillation range of 210 to 356° F., a CFR-R octane number of 44.0, an API gravity of 55.2°, a Reid vapor pressure of 1.1 pounds per square inch, and a composition consisting of 50.0 percent by volume of paraffins, a trace of olefins, 41.5 percent naphthenes, 8.5 percent aromatics, 0.028 percent sulfur, and 0.01 percent nitrogen (Kjeldahl). The catalyst activity was calculated as the relative quantity, expressed as a percentage, of an arbitrarily chosen standard catalyst required to produce a $C_{5+}$ product fraction having the same octane number under the same test conditions.

Comparative results of the hydroforming tests on the two catalysts indicated that the catalyst supported on alkalia-aged and dried alumina was greatly superior in activity:

| Product Interval, hours | Alkali-Aged Catalyst | | Conventional Catalyst | |
|---|---|---|---|---|
| | Octane No., CFR-R | Relative Activity | Octane No., CFR-R | Relative Activity |
| 0–20 | 100 | 185 | 93.2 | 53 |
| 20–40 | 98.6 | 146 | 94.3 | 54 |
| 40–60 | 98.1 | 134 | 93.1 | 52 |
| 60–80 | 98.0 | 132 | 92.2 | 46 |
| 80–100 | 97.7 | 126 | 92.3 | 40 |
| 100–120 | 97.4 | 120 | 93.4 | 49 |
| 120–140 | 96.6 | 102 | | |
| 140–160 | 96.2 | 95 | | |
| 160–180 | 95.6 | 86 | | |
| 180–200 | 95.7 | 87 | | |

At the end of the hydroforming test on the alkali-aged catalyst, the catalyst was removed from the reactor and subjected to reactivation according to the following procedure. A stream of gas containing 2 percent oxygen and 0.5 percent water in nitrogen was passed over the catalyst at 850° F. and 300 pounds per square inch gage at the rate of 2 cubic feet per hour for 4 hours. The carbon was burned thereby from the catalyst. Thereafter, the dilute oxygen-nitrogen mixture was replaced with air containing 0.5 percent of water, the temperature was raised to 1050° F., and the catalyst was exposed to these conditions for a period of 12 hours. The treated catalyst was returned to the reactor and subjected to the standard hydroforming activity test, which demonstrated that the activity thereof had been largely restored:

| Product Interval, hr. | Octane No., CFR-R | Relative Activity |
|---|---|---|
| 0–20 | 99.2 | 162 |
| 20–40 | 98.0 | 132 |
| 40–60 | 98.0 | 132 |
| 60–80 | 97.0 | 111 |
| 80–100 | 96.4 | 98 |
| 100–120 | 95.9 | 90 |
| 120–140 | 95.8 | 88 |
| 140–160 | 95.3 | 82 |
| 160–180 | 95.6 | 86 |

*Example 2*

A series of catalysts supported on an ammonia-aged alumina were prepared according to the procedure described in Example 1 to investigate the effect of temperature in the drying of the alumina cake from the ammonia-aging operation. Catalysts were prepared from four different portions of ammonia-aged alumina which had been dried under the following conditions:

| Temperature, °F. | Time, hr. | Final Volatiles Content, wet basis, percent |
|---|---|---|
| 220 | 16 | 35.5 |
| 375 | 16 | 29.5 |
| 650 | 16 | 9.0 |
| 950 | 2 | 1 |

Standard hydroforming tests on the four catalysts gave the following results:

| Drying Temperature | 220° F. | | 375° F. | | 650° F. | | 950° F. | |
|---|---|---|---|---|---|---|---|---|
| Product Interval, hr. | Octane No., CFR-R | Relative Activity | Octane No., CFR-R | Relative Activity | Octane No., CFR-R | Relative Activity | Octane No., CFR-R | Relative Activity |
| 0-20 | 100 | 185 | 98.6 | 142 | 98.1 | 132 | 97.2 | 116 |
| 20-40 | 98.6 | 146 | 97.8 | 131 | 98.1 | 147 | 96.7 | 92 |
| 40-60 | 98.1 | 134 | 98.1 | 132 | 97.6 | 114 | 96.0 | 89 |
| 60-80 | 98.0 | 132 | 97.7 | 127 | 95.8 | 93 | 94.8 | 82 |
| 80-100 | 97.7 | 126 | 97.7 | 124 | 96.6 | 98 | | |
| 100-120 | 97.4 | 120 | | | 96.7 | 102 | | |
| 120-140 | 96.6 | 102 | | | | | | |
| 140-160 | 96.2 | 95 | | | | | | |
| 160-180 | 95.6 | 86 | | | | | | |
| 180-200 | 95.7 | 87 | | | | | | |

*Example 3*

An alumina powder, prepared according to the general procedure described in Example 1 with the exception that the ammonia-aging of the Heard-type alumina hydrosol was carried out at a pH slightly above 10 for a period of 22 hours, was impregnated to a 0.6 percent platinum level with aqueous chloroplatinic acid alone (not sulfurized), and the catalyst was completed and tested in the usual manner, with the following results:

| Product Interval, hr. | Octane No., CFR-R | Relative Activity |
|---|---|---|
| 0-20 | 98.9 | 153 |
| 20-40 | 98.5 | 143 |
| 40-60 | 98.1 | 134 |
| 60-80 | 98.2 | 138 |

*Example 4*

Another portion of the alumina powder in Example 3 was impregnated to a 0.6 percent platinum level with an aqueous solution containing chloroplatinic acid and aluminum chloride in a 1:3 molar ratio. The catalyst was completed and tested in the usual manner, with the following results:

| Product Interval, hr. | Octane No., CFR-R | Relative Activity |
|---|---|---|
| 0-20 | 99.3 | 147 |
| 20-40 | 98.8 | 121 |
| 40-60 | 96.9 | 87 |
| 60-80 | 96.0 | 74 |

*Example 5*

Another portion of alumina powder, prepared as described in Example 3, was impregnated to a platinum level of 0.3 percent with an aqueous solution containing ammonium sulfide and chloroplatinic acid in an S:Pt atomic ratio of 2.5:1. The catalyst was completed and tested in the usual manner, with the following results:

| Product Interval, hr. | Octane No., CFR-R | Relative Activity |
|---|---|---|
| 0-20 | 97.1 | 81 |
| 20-40 | 96.0 | 80 |
| 40-60 | 95.7 | 79 |
| 60-80 | 94.6 | 67 |
| 80-100 | 93.0 | 56 |

*Example 6*

Another portion of alumina powder, prepared as described in Example 3, was impregnated to a platinum level of 0.1 percent with an aqueous solution containing ammonium sulfide and chloroplatinic acid in an S:Pt atomic ratio of 8:1. The catalyst was completed and tested in the usual manner, with the following results:

| Product Interval, hr. | Octane No., CFR-R | Relative Activity |
|---|---|---|
| 0-20 | 94.7 | 62 |
| 20-40 | 91.8 | 46 |

*Example 7*

An ammonia-aged alumina powder, prepared as described in Example 3, was lubricated with 4 percent Sterotex, formed into ⅛" x ⅛" cylindrical pills, and calcined in air at 1100° F. for 6 hours. The resulting pills were impregnated to a 0.3 percent platinum level with an aqeous solution containing aluminum chloride and chloroplatinic acid in a molar ratio of 3.2:1. The impregnated pills were again dried at 220° F. for 17 hours, calcined in air at 1100° F. for 6 hours, and subjected to the standard hydroforming test, with the following results:

| Product Interval, hr. | Octane No., CFR-R | Relative Activity |
|---|---|---|
| 20 | 100.6 | 215 |
| 40 | 99.6 | 180 |
| 60 | 99.8 | 190 |
| 80 | 98.4 | 138 |
| 100 | 97.0 | 120 |
| 120 | 96.1 | 101 |
| 130 | 95.1 | 100 |

*Example 8*

Approximately 35 gallons of Heard-type alumina hydrosol containing 4.67 weight-percent of $Al_2O_3$ were placed in a 50-gallon ceramic vessel, and 40 pounds of concentrated (29.8 weight-percent) ammonia solution were added with stirring over a period of 3 hours, thereby raising the pH of the mixture to 10.5. During this time, the mixture passed through a rigid gel stage and was converted into a thick, translucent gray slurry. This slurry was aged in place for 7 days, with 0.5 hour of stirring each day. By the end of one day, the color had changed to a creamy white. At the end of 7 days, the material was filtered, 4 additional days being required for this operation. The filter cake was dried overnight at 240° F.

The dried cake was crushed to pass a 30-mesh screen, and was blended in a Patterson-Kelley V-blender. The powder was found to contain 65.1 weight-percent $Al_2O_3$, wet basis, which corresponds closely to the formula $Al_2O_3 \cdot 3H_2O$.

A 0.6% platinum-on-alumina catalyst was made from the completed alumina in the following way: A solution was prepared from 20.43 grams of Mallinckrodt chloroplatinic acid ($H_2PtCl_6 \cdot xH_2O$, containing approximately 40 weight-percent platinum) and 1,300 milliliters of water, and the solution was blended with 2,089 grams of the dried alumina powder in a 5-quart Waring blendor. The mixture was poured into Pyrex trays and dried overnight in a 260° F. oven. The dried cake was crushed to pass a 30-mesh screen, mixed with 4 percent by weight of Sterotex (pelleting lubricant), and formed into 1/8" x 1/8" pills with a Stokes single-punch pelleting machine. The raw pellets were placed in a stainless steel wire basket in a muffle furnace, heated to 1000° F. over a period of 3 hours, held at 1000° F. for 6 hours, and cooled.

The completed catalyst was subjected to a standardized hydroforming test as described in Example 1, with the exception that a hydrofined Mid-Continent naphtha was employed as the charging stock. The said naphtha had an ASTM distillation range of 198 to 364° F., a CFR–R octane number of 44.5, an API gravity of 55.6°, an index of refraction ($n_D^{20}$) of 1.4212, a bromine number of 1.24, an $H_2S$ number of zero, a mercaptan number of 0.64, and a composition consisting of 44 percent by volume of paraffins, a trace of olefins, 48 precent naphthenes, 8 percent aromatics, 6 parts per million of sulfur (turbidimetric), 34 parts per million of water, 0.6 part per million of chloride, 1.39 parts per million of peroxide, and between about 2 and 3 parts per million of nitrogen. The catalyst activity was calculated as the relative quantity, expressed as a percentage, of an arbitrarily chosen standard catalyst required to produce a $C_{5+}$ product fraction having the same octane number from a standard Mid-Continent virgin naphtha (Example 1) under the same test conditions. The results were as follows:

| Product Interval, hr. | Octane No., CFR–R [1] | Relative Activity |
| --- | --- | --- |
| 0–20 | 99 | 184 |
| 20–40 | 96.8 | 139 |
| 40–60 | 97.9 | 118 |
| 60–80 | 96.5 | 105 |
| 80–100 | 96.0 | 96 |
| 100–120 | 95.6 | 90 |
| 120–140 | 95.6 | 91 |
| 140–160 | 95.0 | 82 |

[1] Adjusted to an average catalyst temperature of 900° F.

Example 9

Another portion of the completed alumina, prepared as described in Example 8, was impregnated to a platinum level of 0.6 percent with an aqueous solution containing ammonium sulfide and chloroplatinic acid in an S:Pt atomic ratio of approximately 1. The catalyst was completed as described in Example 8, and was subjected to the standard hydroforming test described in Example 1, employing a Mid-Continent virgin naphtha as the charging stock. The results were as follows:

| Product Interval, hr. | Octane No., CFR–R [1] | Relative Activity |
| --- | --- | --- |
| 0–20 | 97.3 | 127 |
| 20–40 | 97.1 | 117 |
| 40–60 | 97.0 | 114 |
| 60–80 | 97.0 | 116 |
| 80–100 | 97.3 | 123 |
| 100–120 | 97.0 | 114 |

[1] Adjusted to an average catalyst temperature of 900° F.

This catalyst, it will be observed, exhibited substantially constant activity over a period of 120 hours.

Example 10

Approximately 4 liters of Heard-type alumina hydrosol, containing 5.13 percent by weight of $Al_2O_3$, were commingled with a sufficient quantity of concentrated aqueous ammonium hydroxide solution to raise the pH to about 11, and the mixture was allowed to stand at room temperature. After 6 days, the mixture was filtered, and the alumina cake was dried overnight at approximately 420° F. The dried cake, weighing 190 grams and containing 150 grams of $Al_2O_3$, was crushed and mixed with an aqueous solution of 2.2 grams of a chloroplatinic acid hydrate equivalent to 0.88 gram of platinum. The resulting mixture was dried overnight at 220° F., crushed, lubricated, formed into 1/8" pellets, and calcined 6 hours at 1000° F. A standard hydroforming activity test was carried out on the completed catalyst as described in Example 1, with the following results:

| Product Interval, hr. | Octane No., CFR–R [1] | Relative Activity |
| --- | --- | --- |
| 0–20 | 99.9 | 186 |
| 20–40 | 97.6 | 130 |
| 40–60 | 97.0 | 115 |
| 60–80 | 97.0 | 115 |
| 80–100 | 96.0 | 96 |
| 100–120 | 96.3 | 102 |
| 120–140 | 96.1 | 99 |
| 140–160 | 96.0 | 96 |

[1] Adjusted to an average catalyst temperature of 900° F.

Our improved catalyst is broadly useful in hydrocarbon-conversion reactions which are catalyzed by platinum. Specifically, our catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art. Our catalyst is especially advantageous in the hydroforming of petroleum naphthas boiling in the range of about 200 to 400° F. Such naphthas are suitably contacted in the vapor phase with the catalyst at a temperature between about 800 to 1000° F., a pressure between about 100 and 1000 pounds per square inch gage, an hourly weight space velocity between about 0.5 and 10, and a hydrogen recycle rate between about 2,000 and 10,000 standard cubic feed per barrel of charging stock. Under these conditions, our catalyst is capable of upgrading a 50 percent naphthenic naphtha having a CFR–R octane number of only 40 to 50 into a $C_{5+}$ gasoline having an octane number of 90 to 100 in a yield of 80 to 85 percent.

While we have described our invention with reference to certain specific embodiments thereof, it is to be understood that such embodiments are illustrative only and not by way of limitation. Numerous modifications and equivalents of our invention will be apparent from the foregoing description to those skilled in the art.

This application is a continuation-in-part of our application Serial No. 416,441, filed March 15, 1954, now abandoned.

In accordance with the foregoing description, we claim as our invention:

1. An alumina-supported platinum catalyst prepared by a process which comprises digesting amalgamated aluminum in water acidulated with a weak organic acid at a temperature below about 160° F. to form an alumina hydrosol, adding to said hydrosol a water-soluble nitrogen base in a sufficient quantity to raise the pH thereof to a level within the range of about 8.5 and 12, wherein said pH is insufficient to convert any considerable proportion of the alumina into aluminate salts, maintaining at a temperature between about 70 and about 100° F. the resulting mixture at a pH within said range for a period of between about 6 to about 24 hours, whereby a filterable slurry of solid, hydrous alumina is obtained, separating solid, hydrous alumina from the resulting slurry, drying at a temperature below about 400° F. the separated alumina to a volatiles content between about 15 and 50 percent by weight, wet basis, impregnating the dried alumina with between about 0.05 and 1 percent by weight of platinum, based on dry $Al_2O_3$, and drying and calcining.

2. The catalyst of claim 1 wherein said alkaline substance is a water-soluble amine.

3. A catalyst for preparing an alumina-supported platinum catalyst which comprises commingling an alumina hydrosol, prepared by digesting amalgamated aluminum in water acidulated with a weak organic acid, with a quantity of ammonia sufficient to raise the pH of the resulting mixture to a level within the range of about 8.5 to 12, maintaining the resulting mixture at a pH within said range and at a temperature between about 70 and about 100° F. for a period in excess of one hour, whereby a filterable slurry of solid, hydrous alumina is obtained, separating said solid, hydrous alumina from the said slurry, drying at a temperature below about 400° F. said holid, hydrous alumina to a volatiles content between about 15 and 50 percent by weight, wet basis, impregnating the dried alumina with an aqueous platinum solution to a platinum level between about 0.05 and 1 percent by weight, based on dry $Al_2O_3$, and drying and calcining.

4. The catalyst of claim 3 wherein said aqueous platinum solution contains aluminum chloride in a mol ratio of aluminum chloride to said calcined alumina of between about 0.001 and about 0.02.

5. A method for preparing a platinum-alumina catalyst which comprises commingling an alumina hydrosol, prepared by digesting amalgamated aluminum in water acidulated with a weak organic acid, with a quantity of aqueous ammonium hydroxide sufficient to raise the pH of the resulting mixture to a level within the range of about 10 to 11, maintaining the resulting mixture at a pH within said range and at a temperature between about 70 and 100° F. for a period of about 6 to 24 hours, whereby a filterable slurry of solid, hydrous alumina is obtained, separating said solid, hydrous alumina from said slurry, drying said solid, hydrous alumina at a temperature below about 400° F. to a volatiles content between about 15 and 40 percent by weight, wet basis, impregnating the dried alumina with an aqueous platinum solution to a platinum level between about 0.05 and 1 percent by weight, based on dry $Al_2O_3$, and drying and calcining.

6. A method for preparing a catalyst from an alumina hydrosol obtained by digesting amalgamated aluminum in water acidulated with a weak organic acid, which comprises commingling said alumina hydrosol with a quantity of aqueous ammonium hydroxide sufficient to raise the pH of the resulting mixture to a level within the range of about 10 to 11, maintaining the resulting mixture at a pH within said range and at ordinary temperature for a period of about 6 to 24 hours, whereby a filterable slurry of solid, hydrous alumina is obtained, filtering the said solid, hydrous alumina from said slurry, drying said solid, hydrous alumina at a temperature between about 150 and 400° F. to a volatiles content between about 15 and 40 percent by weight, wet basis, impregnating the dried alumina to a platinum level between about 0.05 and 1 percent by weight, based on dry $Al_2O_3$, employing a sulfided aqueous solution of chloroplatinic acid as the impregnating medium, and drying and calcining.

7. A method for preparing a catalyst from an alumina hydrosol obtained by digesting amalgamated aluminum in water acidulated with a weak organic acid which comprises commingling said alumina hydrosol with a quantity of aqueous ammonium hydroxide sufficient to raise the pH of the resulting mixture to a level within the range of about 10 to 11, maintaining the resulting mixture at a pH within said range and at ordinary temperature for a period of about 6 to 24 hours, whereby a filterable slurry of solid, hydrous alumina is obtained, filtering said solid, hydrous alumina from said slurry, drying said solid, hydrous alumina at a temperature between about 150 and 400° F. for about 16 hours to a volatiles content of about 35 percent by weight, wet basis, crushing the dried cake to pass 30 mesh, impregnating the resulting powder to a platinum level of about 0.3 percent by weight, based on dry $Al_2O_3$, employing an aqueous solution of chloroplatinic acid and ammonium sulfide as the impregnating medium, drying the impregnated alumina, incorporating a lubricant therein, forming the mixture into pellets, and calcining.

8. A method for preparing a platinum-alumina catalyst of superior catalytic stability which comprises commingling an alumina hydrosol, prepared by digesting amalgamated aluminum in water acidulated with a weak organic acid, with a quantity of aqueous ammonium hydroxide sufficient to raise the pH of the resulting mixture to a level within the range of about 10 to 11, maintaining the resulting mixture at a pH within said range and at a temperature between about 70 and 100° F. for a period of about 75 to 150 hours, whereby a filterable slurry of solid, hydrous alumina is obtained, separating said solid, hydrous alumina from said slurry, drying said solid, hydrous alumina at a temperature between about 150 and 400° F. to a volatiles content between about 15 and 40 percent by weight, wet basis, impregnating the dried alumina with an aqueous platinum solution to a platinum level between about 0.05 and 1 percent by weight, based on dry $Al_2O_3$, and drying and calcining, whereby a catalyst is obtained having two maxima in the distribution of pore volume with respect to pore diameter.

9. A process for hydroforming a petroleum naphtha which comprises contacting said petroleum naphtha under hydroforming conditions with a catalyst prepared by commingling an alumina hydrosol, prepared by digesting amalgamated aluminum in water acidulated with a weak organic acid, with a quantity of ammonia sufficient to raise the pH of the resulting mixture to a level within the range of about 8.5 to 12, wherein said pH is insufficient to convert any considerable proportion of the alumina into aluminate salts, maintaining the resulting mixture at a pH within said range and at a temperature between about 70 to 100° F. for a period of about 6 to about 24 hours, whereby a filterable slurry of solid, hydrous alumina is obtained, separating the solid, hydrous alumina from said slurry, drying said solid, hydrous alumina at a temperature below about 400° F. to a volatiles content between about 15 and 50 percent by weight, wet basis, impregnating the dried alumina with an aqueous platinum solution to a platinum level between about 0.05 and 1 percent by weight, based on dry $Al_2O_3$, and drying and calcining.

10. A process for hydroforming a petroleum naphtha which comprises contacting said petroleum naphtha under hydroforming conditions with a catalyst prepared by commingling an alumina hydrosol, prepared by digesting amalgamated aluminum in water acidulated with a weak organic acid, with a quantity of ammonium hydroxide sufficient to raise the pH of the resulting mixture to a level within the range of about 10 to 11, maintaining the resulting mixture at a pH within said range and at a temperature between about 70 and 100° F. for a period of about 6 to 24 hours, whereby a filterable slurry of solid, hydrous alumina is obtained, separating said solid, hydrous alumina from said slurry, drying said solid, hydrous alumina to a volatiles content between about 15 and 40 percent by weight, wet basis, impregnating the dried alumina to a platinum level between about 0.05 and 1 percent by weight, based on dry $Al_2O_3$, employing a sulfided aqueous solution of chloroplatinic acid as the impregnating medium, and drying and calcining.

11. A process for hydroforming a petroleum naphtha which comprises contacting said petroleum naphtha under hydroforming conditions with a catalyst of superior catalytic stability, prepared by commingling an alumina hydrosol, prepared by digesting amalgamated aluminum in water acidulated with a weak organic acid, with a quantity of aqueous ammonium hydroxide sufficient to raise the pH of the resulting mixture to a level within the range of about 10 to 11, maintaining the resulting mixture at a pH within said range and at a temperature between about 70 and 100° F. for a period of about 75 to 150 hours, whereby a filterable slurry of solid, hydrous alumina is obtained, separating said solid, hydrous alumina from said slurry, drying said solid, hydrous alumina at a temperature between about 150 and 400° F. to a volatiles content between about 15 and 40 percent by weight, wet basis, impregnating the dried alumina with an aqueous platinum solution to a platinum level between about 0.05 and 1 percent by weight, based on dry $Al_2O_3$, and drying and calcining, whereby a catalyst is obtained having two maxima in the distribution of pore volume with respect to pore diameter.

12. The method of claim 5 wherein said aqueous platinum solution contains aluminum chloride in a molar ratio of said chloride to said dried alumina between about 0.001 and about 0.02.

References Cited in the file of this patent

UNITED STATES PATENTS

| | | |
|---|---|---|
| 2,326,369 | La Lande | Aug. 10, 1943 |
| 2,479,110 | Haensel | Aug. 16, 1949 |
| 2,636,863 | Haensel | Apr. 28, 1953 |
| 2,658,028 | Haensel | Nov. 3, 1953 |
| 2,689,226 | Hoekstra | Sept. 14, 1954 |
| 2,787,522 | Lefrancois | Apr. 2, 1957 |
| 2,818,393 | Lefrancois et al. | Dec. 13, 1957 |